United States Patent
Klein et al.

(10) Patent No.: US 10,866,741 B2
(45) Date of Patent: Dec. 15, 2020

(54) EXTENDING SSD LONGEVITY

(71) Applicant: Toshiba Memory Corporation, Tokyo (JP)

(72) Inventors: Yaron Klein, Raanana (IL); Miki Schnarch, Or-Yehuda (IL)

(73) Assignee: Toshiba Memory Corporation, Tokyo (JP)

( * ) Notice: Subject to any disclaimer, the term of this patent is extended or adjusted under 35 U.S.C. 154(b) by 13 days.

(21) Appl. No.: 15/667,109

(22) Filed: Aug. 2, 2017

(65) Prior Publication Data
US 2019/0042106 A1    Feb. 7, 2019

(51) Int. Cl.
*G06F 3/06*    (2006.01)

(52) U.S. Cl.
CPC ......... *G06F 3/0616* (2013.01); *G06F 3/0647* (2013.01); *G06F 3/0688* (2013.01)

(58) Field of Classification Search
CPC ..... G06F 3/0616; G06F 3/0647; G06F 3/0688
USPC ........................................................ 711/103
See application file for complete search history.

(56) References Cited

U.S. PATENT DOCUMENTS

| | | | |
|---|---|---|---|
| 8,533,711 B2 * | 9/2013 | Heim ................. | G06F 9/45558 718/1 |
| 9,442,670 B2 * | 9/2016 | Kruger ................. | G06F 3/0634 |
| 2014/0181370 A1 * | 6/2014 | Cohen ................. | G06F 12/0246 711/103 |
| 2015/0193154 A1 * | 7/2015 | Gong ................... | G06F 3/0608 711/103 |
| 2017/0147237 A1 * | 5/2017 | Fang ..................... | G06F 3/0647 |
| 2017/0160957 A1 | 6/2017 | Thangaraj et al. | |
| 2018/0011642 A1 * | 1/2018 | Koseki ..................... | G06F 3/06 |

OTHER PUBLICATIONS

Xio-Yu et al., "Write Amplification Analysis in Flash-Based Solid State Drives," IBM Research, IBM Zurich Research Laboratory, Ruschlikon, Switzerland, pp. 1-9, May 4, 2009.
International Search Report dated Jan. 9, 2019.

* cited by examiner

*Primary Examiner* — Reginald G Bragdon
*Assistant Examiner* — Aaron D Ho
(74) *Attorney, Agent, or Firm* — White & Case LLP

(57) ABSTRACT

A storage appliance includes a first SSD, a second SSD, and a controller. The controller is able to calculate a first utilization parameter of the first SSD and a second utilization parameter of the second SSD. If the first utilization parameter is less than a threshold and the second utilization parameter exceeds the threshold, the controller identifies a data range stored on the first SSD to be removed. The removal of the data range from the first SSD causes the first utilization parameter to exceed the threshold. The controller then migrates the data range from the first SSD to the second SSD.

21 Claims, 8 Drawing Sheets

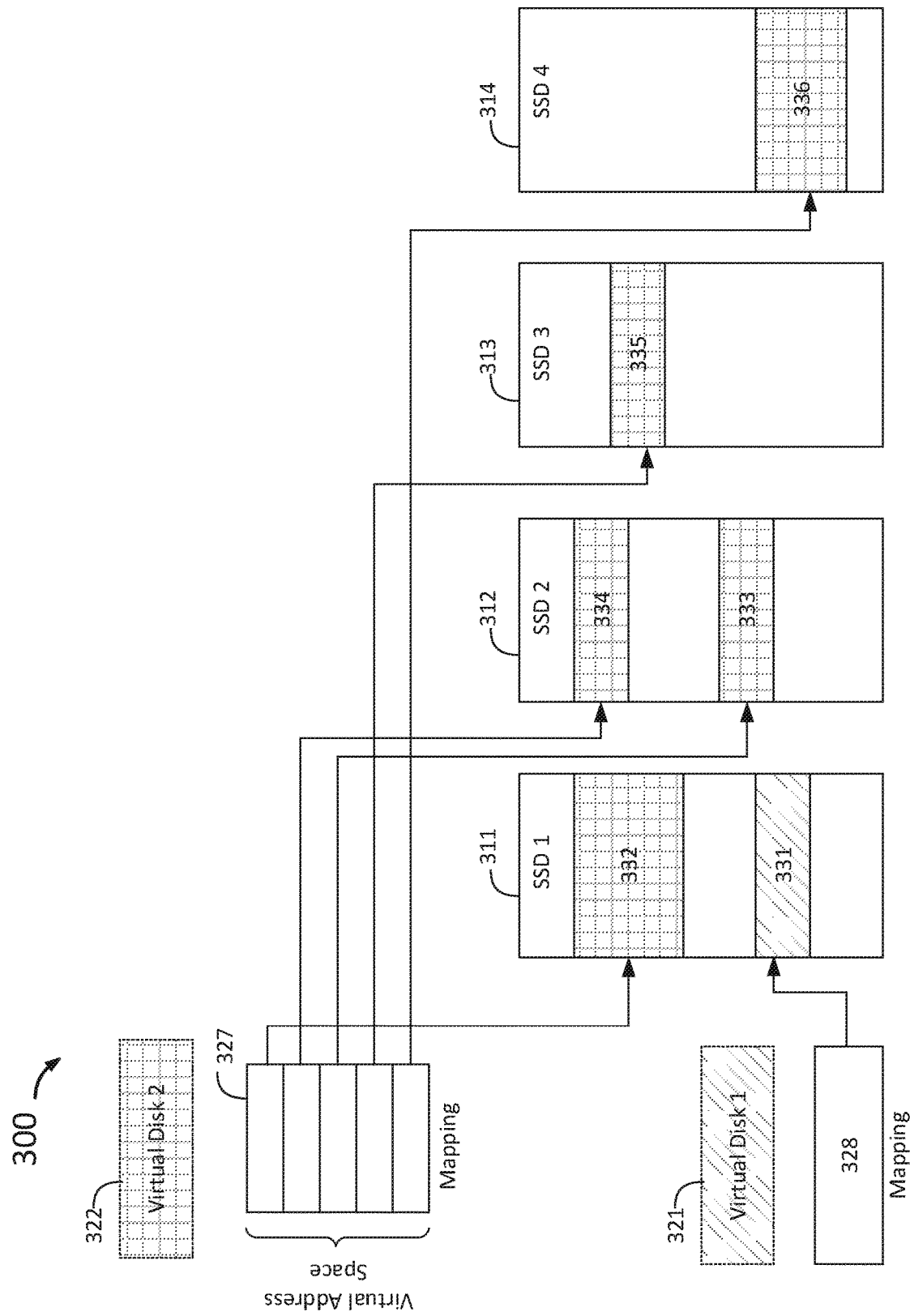

EXTENDING SSD LONGEVITY

FIELD OF THE INVENTION

The present invention generally relates to systems and methods to increase longevity of an SSD storage device.

BACKGROUND OF THE INVENTION

Flash-based storage media, such as the memory devices employed in solid-state drives (SSDs), comprise flash cells arranged in units of planes, blocks, and pages. Each plane contains a number of blocks, which are the smallest unit that can be erased. Each block contains a number of pages, which are the smallest unit that can be written with data. Within an SSD, a memory controller is responsible for mapping the logical block addresses of application data to be written to or read from the physical flash pages.

Storage media disks have a finite lifespan over which they are operable. Hard disk drives (HDDs) are mechanical devices that wear out with use, and may fail unexpectedly and catastrophically. SSDs typically have more than twice the longevity of HDDs, but differ in how they wear in comparison to HDDs. Due to the characteristics of NAND flash, the lifespan of an SSD is dictated by the number of write operations that the NAND flash can endure. Write operations are also known as program/erase (P/E) cycles, because data may be written using a program memory command only after the previous memory contents are removed using an erase memory command.

Since data may be overwritten only after first erasing previous data in a flash memory, it is common practice to provide extra working space in an SSD which functions as an area of freshly erased flash memory blocks where new data may be written. This practice is known as Over Provisioning (OP). After new data is written, the previous data is marked as invalid. Eventually a sufficient number of invalid data pages are present in a flash memory block for the system to begin a process known as Garbage Collection (GC). During the GC process, remaining valid data pages are written to freshly erased blocks and the original block, now with all its pages marked as invalid, is erased. The erased block can then be included in the pool of freshly erased blocks to which data can be written. The GC process involves additional data writes, over and above the original writes for new data. This side effect is known as Write Amplification (WA), with the WA factor being the ratio of the average number of additional NAND flash data writes to the original writes. WA causes the lifetime of an SSD to be reduced, by effectively dividing the P/E cycle limit of the flash device by the WA factor. For example, the lifespan of an SSD with a WA factor of 10 will be a tenth of that predicted by the P/E cycle limit.

WA is inversely proportional to OP, where reducing OP has the effect of increasing WA. FIG. 1 shows a prior art plot 100 illustrating the correlation between the OP and WA. The plot 100 includes an x-axis 102 representing OP and a y-axis 104 representing WA. The correlation between the OP and WA is represented by the trace 106, having a knee at 108. The plot 100 is a well-known model of the correlation of OP and WA. A similar plot modeling the correlation of the OP and WA is shown and described in the article "Write Amplification Analysis in Flash-based Solid State Drives," by X-Y Hu et al, IBM Zurich Research Laboratory, SYSTOR 2009, Haifa, Israel, incorporated by reference herein.

It can be seen from the plot 100 that reducing the OP reduces the endurance level of the device as increasing the WA increases the number of NAND flash writes per application data write and reduces the lifespan of a device which has a specified P/E cycle limit. The relationship is not linear, with the rate of increase in WA becoming more and more severe as the OP is reduced below the knee at 108.

The requirement for increased capacity of SSD devices and reduction of the OP to mitigate costs leads to a reduced disk lifespan and increased risk of early disk failure with severe impacts in cost and usability/access of stored data. Accordingly, there is a long-felt need to correct the problems inherent in present day SSD systems.

BRIEF DESCRIPTION OF THE INVENTION

In an aspect, a storage appliance includes a first SSD, a second SSD, and a controller. The controller is able to calculate a first utilization parameter of the first SSD and a second utilization parameter of the second SSD. If the first utilization parameter is less than a threshold and the second utilization parameter exceeds the threshold, the controller identifies a data range stored on the first SSD to be removed. The removal of the data range from the first SSD causes the first utilization parameter to exceed the threshold. The controller then migrates the data range from the first SSD to the second SSD.

In another aspect, a method of balancing the utilization among a plurality of SSDs in a storage appliance includes calculating, at a controller, a first utilization parameter for at least one first SSD, determining that the first utilization parameter for the at least one first SSD is less than a threshold, and selecting a second SSD having a second utilization parameter which exceeds the threshold. The method further includes determining a data range stored on the first SSD where the data range has a utilization level such that with the removal of the data range from the first SSD the first utilization parameter of the first SSD exceeds the threshold, and migrating the data range from the first SSD to the second SSD.

BRIEF DESCRIPTION OF THE FIGURES

FIG. 3 shows a block diagram illustrating a virtual mapping used in the storage appliance according to one or more embodiments;

DETAILED DESCRIPTION OF THE INVENTION

Figure 2:
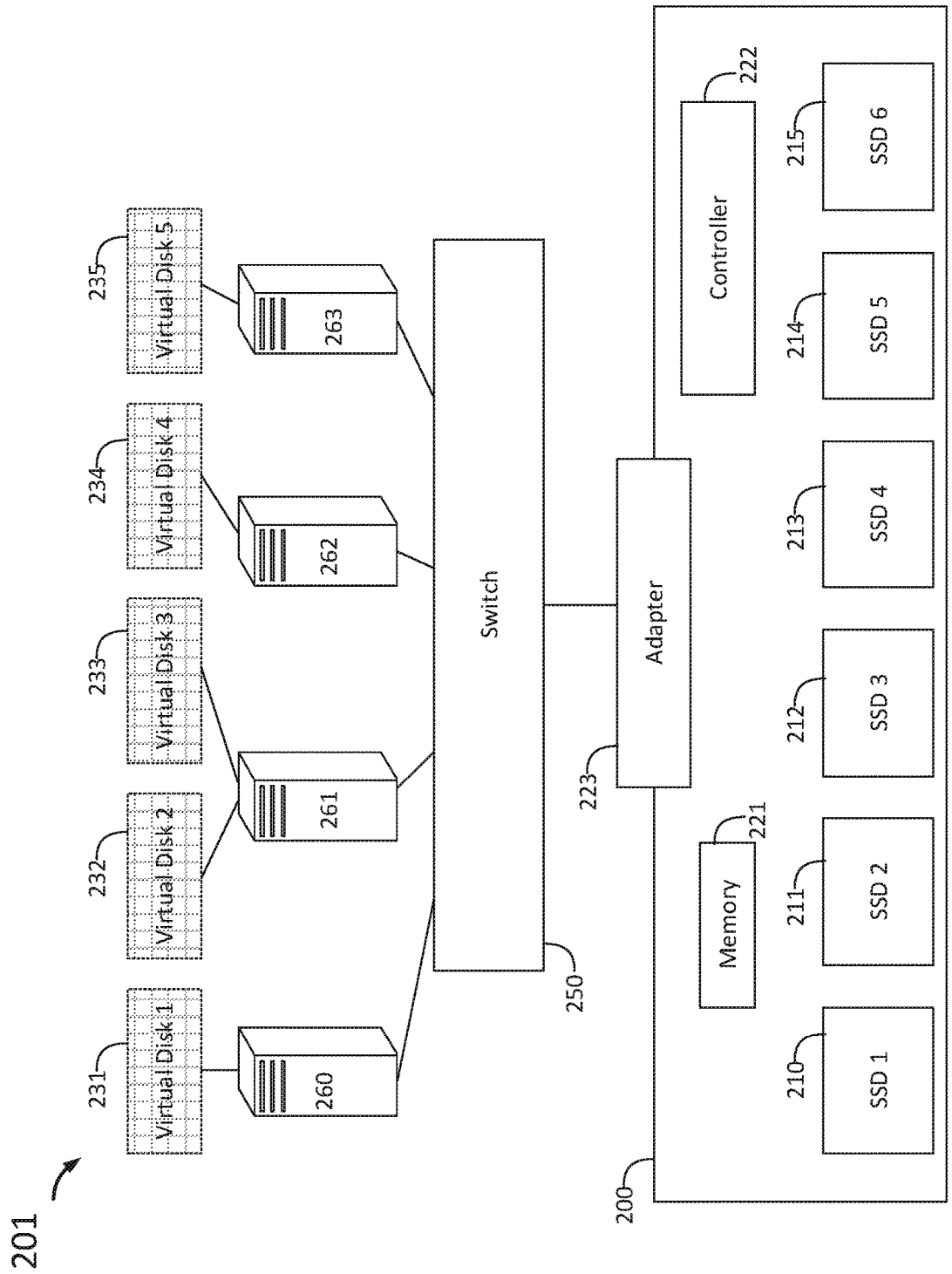
FIG. 2 shows a block diagram of a storage appliance having a plurality of SSDs and a plurality of virtual disks according to one or more embodiments.

FIG. 2 shows a block diagram of a system 201 including a storage appliance 200 having a plurality of SSDs and a plurality of virtual disks. The storage appliance 200 includes a plurality of SSDs 210-215, a controller 222, a memory 221, and an adaptor 223. The system 201 further includes a plurality of hosts 260-263, and a plurality of virtual disks 231-235. The hosts 260-263 are connected to the storage appliance 200 by a switch 250.

For clarity, FIG. 2 is shown with six SSDs 210-215 and five virtual disks 231-235. However, it is understood that the storage appliance 200 may include any number of SSDs, and any number of virtual disks. Similarly, though FIG. 2 shows four hosts 260-263, the storage appliance 200 may include any number of host devices. The terms SSD, SSD drive, and solid state device may be used interchangeably.

The controller 222 runs virtualization software which exposes the plurality of virtual disks 231-235 through the adapter 223 to the plurality of hosts 260-263. The SSDs 210-215 are used as back end storage. The controller 222 is a local controller on the storage appliance 100, which may be any standard SSD storage appliance.

The adapter 223 provides the remote hosts 260-263 access to the storage appliance 200. Remote hosts with the appropriate connectivity can access the storage appliance 200 through the physical switch 250 and a transport protocol such as iSCSI, Fiber Channel (FC), NVME over Fabric, SCSI or any combination of transport protocol and physical connectivity via driver software in the host. The adapter 223 may be an Ethernet port, Fiber Channel (FC) port, SAS, PCIe, InfiniBand (IB) port, or any other appropriate port.

As a result, a remote host (e.g., one of hosts 260-263) is provided with the virtual disks 231-235 which are exposed by the software in the controller 222. For example, host 260 is provided with virtual disk 231, and host 261 is provided with virtual disks 232 and 233. The hosts 260 and 261 interact with storage appliance 200 having a plurality of SSDs 210-215 through the switch 250, and adapter 223 according to the software of the controller 222, but the hosts 260-263 "see" the virtual disks 231-2135 on the appliance rather than the physical SSDs 210-215. Each host sees the virtual disks 231-235 as containing data, but the data is actually stored and managed by the controller 222 on the physical SSDs 210-215 in the storage appliance, accessible to the hosts 260-263 through the switch 250 and adapter 223.

FIG. 3 shows a block diagram illustrating a virtual mapping scheme 300 used in the storage appliance. FIG. 3 includes a first virtual disk 321 with a first virtual mapping table 328, a second virtual disk 322 with a second virtual mapping table 327, a first SSD 311, a second SSD 312, a third SSD 313, and a fourth SSD 314.

The virtual mapping scheme 300 illustrates a first virtualization scheme shown by the mapping of the first virtual disk 321 into the first SSD 311 using the first mapping table 328, which uses one-to-one mapping of the virtual address onto a physical address space. The first virtual disk 321 is mapped into a first physical range 331 in the first SSD 311. The data in the first virtual disk 321 is sized such that the data can be placed consecutively in the first SSD 311. Additional data from the first virtual disk 321 or from other virtual disks can also be placed consecutively in the first SSD 311 until the first SSD 311 has no more space. The first virtual mapping table 328 stores mapping information, SSD identification, an indicator for a starting Logical Block Address (LBA) and length of the range of data placed in the first SSD 311.

In a second, more complex example, the virtual mapping scheme 300 illustrates a virtual address space that points to multiple ranges over a plurality of physical devices. This is shown by the mapping of the second virtual disk 322 onto ranges in multiple SSDs, including the first SSD 311, the second SSD 312, the third SSD 313, and the fourth SSD 314 according to the second mapping table 328. As can be seen, the second virtual disk 322 is located in range 332 in the first SSD 311, ranges 334 and 335 in the second SSD 312, range 335 in the third SSD 313 and range 336 in the fourth SSD 314. The second mapping table 328 of the second virtual disk 321 is a Scatter Gather List (SGL) of the ranges in which the virtual disk data is stored, including their location, start LBA and length of the range.

The data from the second virtual disk 321 is mapped from virtual space into physical space on multiple SSDs. The data from the second virtual disk 321 is separated into ranges or chunks which are placed on multiple physical SSDs in the storage appliance.

This second example including virtual disk data from the second virtual disk 321 mapped to ranges on a variety of SSDs is more likely to be encountered if the data in the virtual disk is too large for the data to be placed on a single physical SSD, the data may be split into chunks or ranges and placed across multiple SSDs. Mapping of the second virtual disk 321 onto multiple SSDs can also occur in a fragmented virtual address space, or in a storage appliance which has been in use for some time. For example, after a storage appliance has been used for a time and virtual disks have been created and deleted, multi-range mapping of virtual disks to physical SSD storage is required to distribute the virtual disk data on the physical storage.

As data is stored on an SSD, the allocated portion of the SSD, as well as the utilization level of the SSD, increases. When an SSD has a high utilization level, the effective OP may be minimized and the WA may be high. And since WA is inversely correlated with SSD longevity, the SSD with high utilization may have an increased risk of disk failure.

Figure 4A:
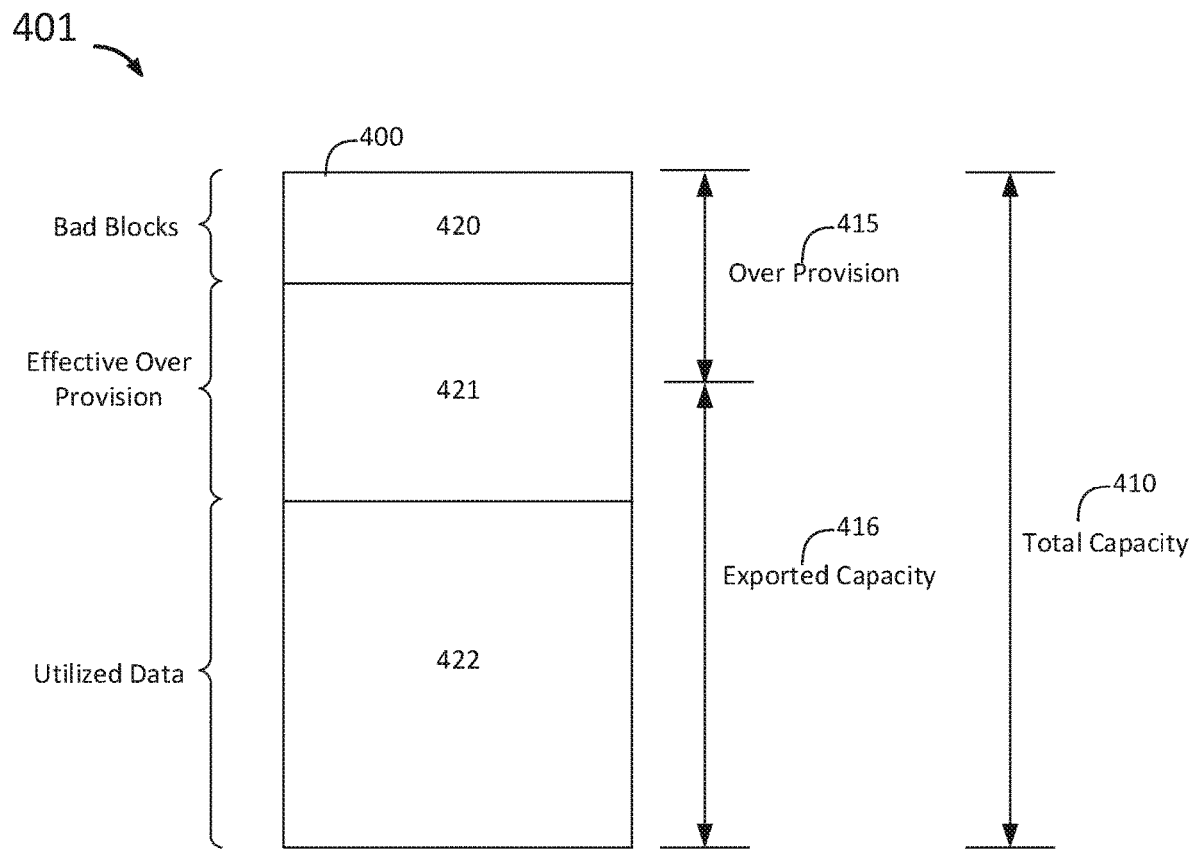
FIG. 4A shows a block diagram of various SSDs used to extract the utilization level of an SSD according to one or more embodiments.
Figure 4B:
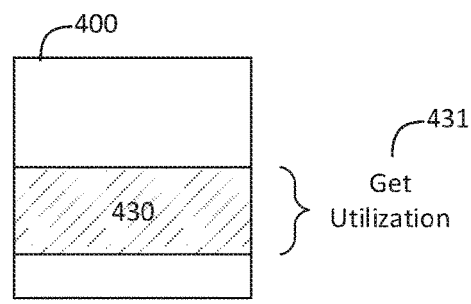
FIG. 4B shows an extended Application Programming Interface (API) used to extract the utilization level of an SSD according to one or more embodiments.

FIGS. 4A and 4B show memory representation of a SSD and an extended API used to extract the utilization level of the SSD, respectively. FIG. 4A shows a memory representation 401 of an SSD 400 and typical SSD parameters. The SSD 400 is composed of NAND pages, and typically contains utilized pages 422 containing data, bad blocks 420, and free or dirty NAND pages included in the effective OP 421. The bad blocks 420 is shown enlarged for clarity, but in most cases the bad blocks 420 will occupy a much smaller portion of the SSD 400. The SSD 400 has a total capacity 410 as shown. However, only a portion of the total capacity 410 of the SSD 400 is available for use by the host. The available portion of the SSD 400 to which data can be written is the exported capacity 416. In order to enable the Flash Translation Layer (FTL) to store and efficiently write new data into erased pages (with low WA) and manage invalidated data by performing GC independently in the background, a portion of the total capacity 410 is held as OP 415, or as spare space.

In contrast to an HDD, in which storage is maintained by a fixed mapping from logical to physical address space and physical locations may be re-written freely without first erasing previous data, an SSD contains NAND pages and not all physical addresses are mapped to a logical address.

In an SSD, the logical to physical mapping is not fixed, but rather the mapping changes as data is re-written. An SSD is utilized with the amount of data with which it is filled, and the SSD physical page addresses are only allocated when data is written to the SSD. The amount of data written to the SSD is the utilization level, and the remaining portions of the SSD to which data has not been allocated and written to is the effective OP area. If the SSD is not fully utilized, the unallocated portions are much larger and the effective OP is much higher.

For example, in a 1 TB (Terabyte) storage disk, with 10% OP there will be 100 GB (Gigabyte) of OP storage area unavailable to the user, and 900 GB of storage available. The 900 GB of available storage may be exposed to the user. The 100 GB of OP area is kept as spare pages which allow the SSD to execute GC protocols in the background or to accept new data write commands at the required or specified write data transfer speeds of the SSD. Although the user has access to 900 GB, if the user writes only 400 GB of data to the disk, the effective OP area is the remaining 500 GB of accessible storage space plus the 100 GB of reserved OP area.

The OP area provides the capability to the SSD to immediately overwrite new data into spare previously erased data blocks and pages in order to perform GC protocols in the background on the old data which has been invalidated by overwrites. Without OP, the GC protocols would have to be performed synchronously with the overwriting of the data in order to make erased page space to place the new data, thus slowing down the write performance of the SSD. Though the OP is typically determined during the manufacture of the SSD and is known, the effective OP of an SSD changes during the use of the SSD in writing data to the SSD, overwriting existing data and removing data (using so-called 'Trim' commands specifically designed and defined for SSDs for de-allocating LBAs which have been freed after data is erased in a host filesystem). The current effective OP of an SSD is not available to the user or to the local controller in the storage appliance in conventional storage devices, since the management of logical to physical address mapping and the allocation and de-allocation of NAND flash pages remains within the private domain of the SSD's flash memory controller.

In an operational phase, the SSD 400 contains valid data pages, invalid or dirty data pages (such as data that has been overwritten or trimmed), and free pages. Dirty data pages may become available as free pages after GC processing is performed. Further, during operation, blocks of data may fail due to exceeding P/E cycle limits or other NAND failure mechanisms and become non-operational. These are denoted as bad blocks 420 which increase over time with use of the storage appliance, degrading the total capacity of the storage disk.

OP in SSD 400 is defined as the ratio between unallocated or unutilized data pages and total available data pages of the SSD 400. In a scenario where the SSD is completely filled with data, i.e., to its exported capacity 416, and the unallocated data pages are the remaining spare pages 415. In such a scenario, assuming that there are no bad blocks in the SSD 400, the OP is expressed as a ratio by the following equation (eq. 1).

$$OP = \frac{(\text{Total Capacity} - \text{Exported Capacity})}{\text{Exported Capacity}} \quad (\text{eq. 1})$$

However, in most cases, the SSD 400 will not be entirely filled with data to the total exported capacity 416. The user will actually utilize (utilized data 422) only a portion of the space available for writing on the SSD 400 (the total capacity 410 less the bad blocks 420 or the exported capacity 416). Hence, a more realistic parameter of the SSD 400 is the effective OP, expressed by the following equation (eq. 2).

$$\text{Effective } OP = \frac{(\text{Total Capacity} - \text{Utilized Data} - \text{Bad Blocks})}{\text{Utilized Data}} \quad (\text{eq. 2})$$

As shown in equation 2, the effective OP 421 is determined by the total capacity 410 less the utilized data 422 and the bad blocks 420. When the effective OP is low, the SSD is highly utilized and may be unstable and more prone to failure. Information regarding the effective OP and the utilization of the SSD is not available to the user in conventional storage appliance. However, if the information were available, software in the storage appliance could take advantage of the information to provide greater stability of the device and a longer operational life.

According to one embodiment of the invention, the SSD 400 provides an extended API that provides information on the SSD 400 in the form of data showing the amount of utilized data 422 and the number of bad blocks 420. The API determines the utilization data information for the SSD 400, including the effective OP, and a host or client computer may use such data to balance the utilization of the SSDs in a storage appliance. Alternatively, or in addition, the host may provide the information to a user. By balancing the utilization across the SSDs, the overall lifetime and operation of the storage device is improved as it lowers WA for devices which are over-utilized by a greater amount than the corresponding increase in WA for SSDs which are under-utilized.

In some implementations, the SSD 400 provides an extended API that provides information on the data utilization 431 for a specific range 430 of address space of the SSD 400, as shown in FIG. 4B. For example, the user may provide a start LBA and a length, and the SSD returns, by the API, the data utilization 431 of the provided range.

In some implementations, the range 430 is specified by a user. In some implementations, the range 430 is specified by the manufacturer in the API.

OP is provided by the comparison of the utilized and available space on an SSD, for example as described by equations 1 and 2. The WA is a phenomenon in SSDs in which the actual amount of data that is physically written to memory is greater than the amount of data intended to be written (the difference being due to the movement of valid data pages from partially valid data blocks into new data blocks in order to make fully invalid data blocks which can then be erased, a process which takes place in GC operations). For example, if a user intends to write 1 kB (kilobyte) of data to a disk and there is a WA of 10, the amount of data written to the disk may actually be 10 kB. The OP and WA are predictive of the endurance and performance characteristics of the storage disk. In the above example, the disk having a WA of 10 will reach its endurance limit 10× faster than a disk with a WA of 1, and will have degraded performance approximately 10× slower than the disk with a WA of 1. The derivation of WA from the effective OP is described in full detail in the publication "An Improved Analytic Expression for Write Amplification in NAND Flash," by Luojie et al, arXiv: 1110.4245v1, incorporated by reference herein.

Figure 1:
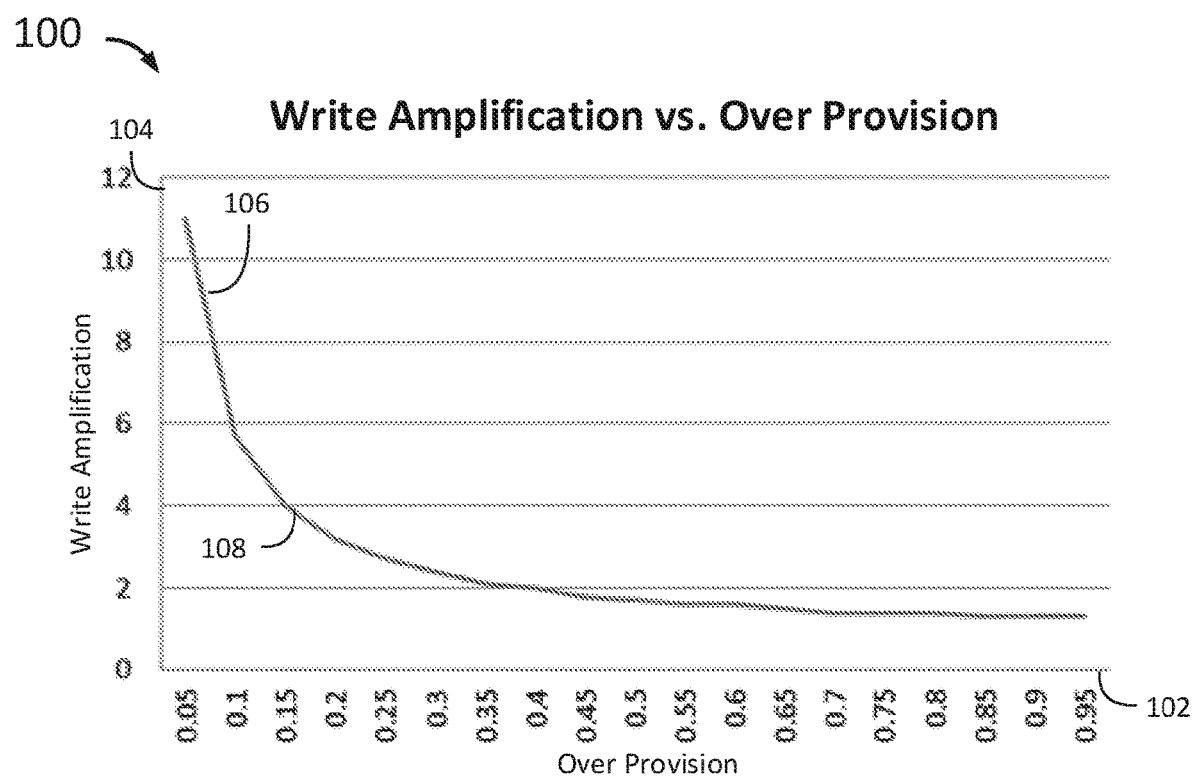
FIG. 1 shows a plot in the prior art illustrating the correlation between the Over Provisioning and Write Amplification.

The WA is inversely proportional to the OP, and the relationship is non-linear, as seen in prior art plot 100 shown in FIG. 1. A small OP correlates to a very high WA, while after the knee 108 at about 20% OP, the WA changes very little with increasing OP. Before the knee 108, at an effective OP of 5% for example, the WA is 11. After the knee 108, at an effective OP of 35%, the WA is 2. The effective OP of a disk has a large effect on the WA of the disk, and as a result on the performance, stability, and endurance of the disk. At a higher effective OP, the endurance and performance of the disk is much better than at a lower effective OP.

OP in an SSD is often minimized in order to lower the cost per available data storage unit to the customer. However, vendors provide a warranty for the operational time period and optimize the OP so the product will not fail before the warranted operational time period.

The warranty for the operational time period can be approximated based on the WA and a Disk Write per Day (DWPD) correlating to the P/E count. An SSD with a lower effective OP due to high utilization or bad blocks may reach its endurance limit before other SSDs and may fail earlier. Hence, the minimization of OP to lower the cost to the customer may adversely affect the lifetime of the product and may actually lead to higher costs to the consumer or vendor.

In order to maximize an operational lifetime of a storage appliance, the OP of the SSD can be optimized during the operational life of the SSD, and should be chosen at each point in time in order to provide optimization of SSD resources. For example, the knee value 108, or other value of OP, may be chosen as a threshold value which the effective OP should be maintained above in order to keep the WA low. In some implementations, the threshold value is used as an alarm notifying the FTL that the amount of spare space in the SSD is approaching a minimum that may bring the SSD to non-functional or Read Only state.

While there may be limited scope for the FTL in a controller of a single SSD to adjust the OP when the OP value reduces and approaches the knee value 108 as the SSD storage becomes more utilized, in a storage appliance where there are multiple individual SSDs managed by a storage appliance controller, there may be more flexibility to adjust and balance the OPs of the individual SSDs by migrating data between SSDs. In some embodiments, the storage appliance controller accesses the OP, bad blocks, and data mapping information using an extended API provided by the SSDs. Using this information, the controller may migrate data from one SSD to another and thereby modify the effective OPs of the source and destination SSDs.

In some embodiments, the threshold value can be a single threshold value. In some implementations, the threshold value can be multiple thresholds. In some implementations, the threshold value may be any other OP-related threshold. In some implementations, when the OP exceeds a threshold value in a particular SSD, the controller of the storage appliance executes a balancing protocol to bring the OP of the SSD back within the threshold value to optimize the operation of the SSD and to prevent failure. In some implementations, the threshold value is an effective OP that corresponds to a target WA of 2 or 3, for example an effective OP of 20-40%. At a WA of 2 or 3, the endurance is dramatically lowered and the performance of the SSD is increased compared to a higher WA.

Figure 5:
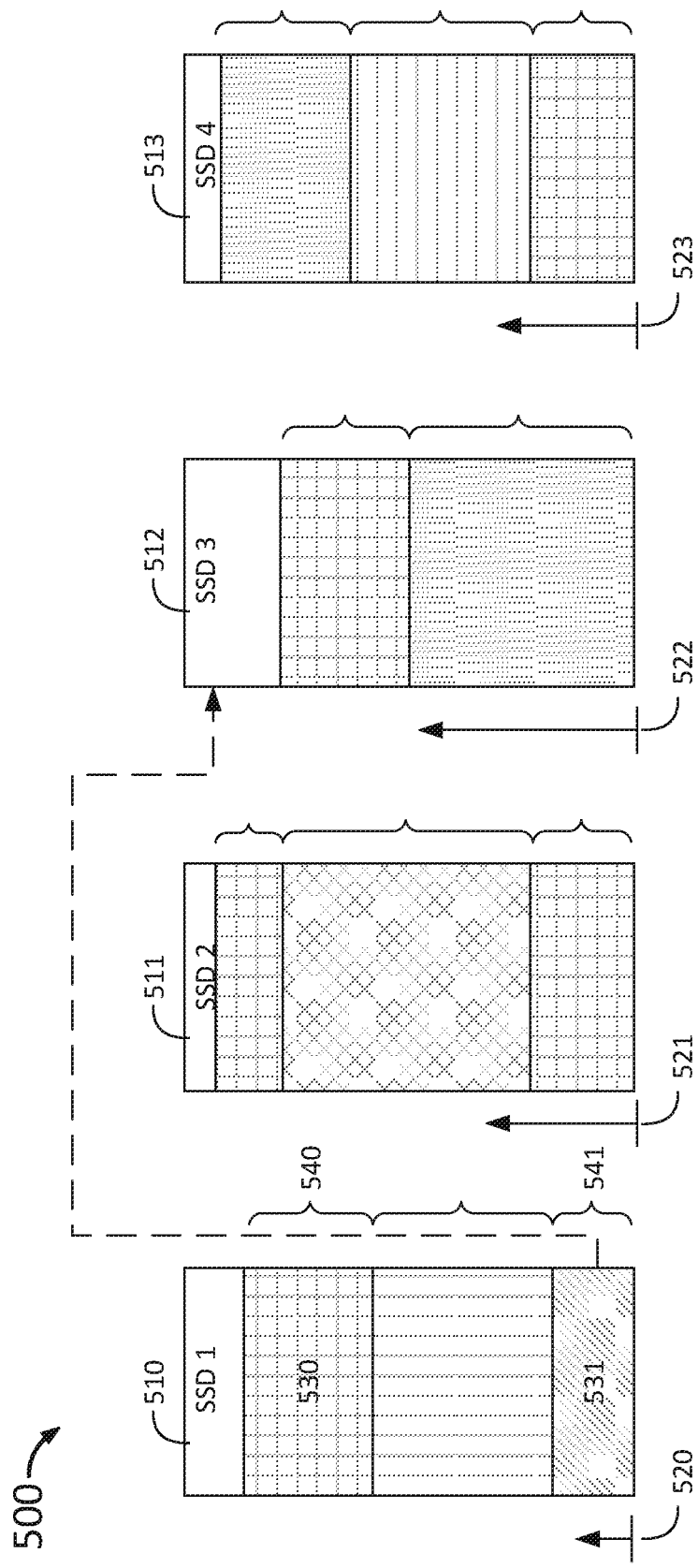
FIG. 5 shows a block diagram illustrating the mechanism of Over Provisioning balancing across a pool of SSDs according to one or more embodiments.

FIG. 5 shows a block diagram 500 of the OP balance across a pool of SSDs illustrating the balancing protocol defined by the controller's extended API. The block diagram includes a first SSD 510, a second SSD 511, a third SSD 512, and a fourth SSD 513. The first SSD 510 includes a first range 530 including data written from a virtual disk, and a second range 531 also including data written from the same or different virtual disk. The first SSD 510 also has a first effective OP 520, indicated by the vertical height of the arrow. The first effective OP can be determined by the controller (such as controller 222 in FIG. 2) as will be explained below. Similarly, the second SSD 511 has a second effective OP 521, the third SSD 512 has a third effective OP 522, and the fourth SSD has a fourth effective OP 523, each indicated by the vertical height of each respective arrow, and which are likewise determined by the controller.

As described above, the effective OP is related to the utilization of the SSD and is predictive of the endurance and performance of the SSD. An SSD with a very low effective OP will be closer to its endurance limit and have poor performance compared to an SSD with a higher effective OP. By balancing the utilization across the SSDs in an SSD pool, the storage appliance has better performance overall and the chance of failure of an SSD is decreased. The effective OP of each of the SSDs in FIG. 5 are not in balance, as indicated by the vertical arrows of varying heights. By using an extended API on the controller to determine the utilization of each SSD and to balance the SSDs according to a predetermined selection heuristic, the performance and stability of the storage appliance can be optimized.

The controller (e.g., controller 222 of FIG. 2) determines the effective OP for each SSD as a measure of the utilization of the SSD. The controller determines the utilization of each SSD from the mapping table by querying the utilization between two LBA values in the table. The controller has access to the mapping table and can determine a utilization level or effective OP by querying the mapping table to determine which LBAs on each SSD have been written to and which have not. The controller can query the mapping table to determine the utilization of an SSD or a portion of the SSD. The utilization level or the effective OP can also be calculated according to equation 2 as the ratio between the utilized space on the first SSD to the total available space.

When a particular SSD's effective OP is below a threshold, the controller performs a check for available space in another SSD. If the controller identifies an SSD which has available space, the controller migrates a range of LBAs to the new SSD with enough available (i.e. unallocated) space. For example, if the controller determines that the first effective OP 520 is below a threshold value, the controller checks the utilization of the remaining SSDs, second SSD 511, third SSD 512, and fourth SSD 513, to determine if any of the SSDs have available space. The controller determines, in this example, that the third SSD 512 has sufficient available space for the second range 531, and that the third SSD 512 has an effective OP which is above the threshold. The controller then migrates the second range 531 from the first SSD 510 to the third SSD 512. The effective OP 520 of the first SSD 510 should increase following the migration of the second range 531 from the first SSD to the resources of the third SSD 512.

The controller may determine the destination SSD to which the data can be migrated by accessing the virtual mapping table. The extended API in the controller can access the mapping table and can extract the mappings of the LBA to the physical pages in the SSD. Using this information, the extended API calculates how many regions or pages of the SSD are mapped to a virtual space and how many are not currently mapped to a virtual space (and are therefore unallocated and available). The controller can thus determine the utilization of various regions of the potential destination SSDs.

Although the example in FIG. 5 illustrates the migration of a single range (second range 531) from the first SSD 510 to the third SSD 512, in other implementations, the controller can migrate multiple ranges from the SSD to multiple other SSDs. The controller can also migrate a single range, such as second range 531, to multiple target ranges across various SSDs by splitting the single range into multiple smaller ranges to be placed on other SSDs.

The range to be migrated may be chosen by the controller via parameters of the extended API for range utilization. The controller calculates the amount of utilized data which must be transferred from the first SSD 510 in order to bring the effective OP 520 over the threshold. The controller then chooses at least one data range which satisfies the required data mount. In some implementations, if multiple data ranges on the first SSD 510 satisfy the required data amount, the controller chooses to migrate the smallest range that satisfies the requirement in order to minimize any migration penalties. In some implementations, if multiple data ranges on the first SSD 510 satisfy the required data amount, the controller chooses the least accessed range that satisfies the requirement. In some implementations, if multiple data ranges on the first SSD 510 satisfy the required data amount, the controller chooses the most accessed range that satisfies the requirement.

The controller performs the balancing protocol such that the pool of SSDs is evenly endured and the SSDs are operational with low WA to increase the longevity of the SSDs and decrease the likelihood of failure. The controller performs the balancing protocol in order to evenly distribute the effective OP across the SSD pool, by pre-calculating the end result OP of the SSDs after migration and choosing an optimum location on an SSD to place the migrated range or ranges across the remaining SSDs. In some implementations, the optimizing is based on minimizing the standard deviation of the post-migration OPs. In some implementations, if the controller determines that the number of bad blocks or writing errors in a particular SSD has increased beyond a threshold, the controller may stop writing data to the SSD and rebalance the remaining data from the SSD to the remaining SSDs. In situations in which the SSD is full, such as when the amount of bad blocks in an SSD is such that the SSD is prevented from operating, the balancing protocol performed by the controller prevents the SSD from failing by utilizing available space on other SSDs in the device.

The SSD pool balancing protocol using migration of data ranges to optimize and equalize the OP across the SSD pool uses detailed data utilization information provided to the controller via the extended API. As discussed above, the data utilization information can be determined per SSD or even more detailed data utilization information can be determined per virtual mapping range on an SSD.

In some implementations, in addition to performing pool balancing protocol on existing data on the physical SSDs, the controller will not map virtual disks onto an SSD such that the operational effective OP threshold is violated. In this manner, the devices are always maintained in an operational state, even when bad blocks accumulate due to endurance or die failure.

The logic for the controller can vary with different cases of implementation such that the utilization of the SSDs is balanced to increase the performance of the storage appliance. Controllers may have extended APIs which use the principles discussed above in order to optimize performance, endurance or exported capacity. In some implementations, the controller may have an extended API that provides information related to the utilization of the SSDs to an external user without actually moving the data between SSDs.

Figure 6:
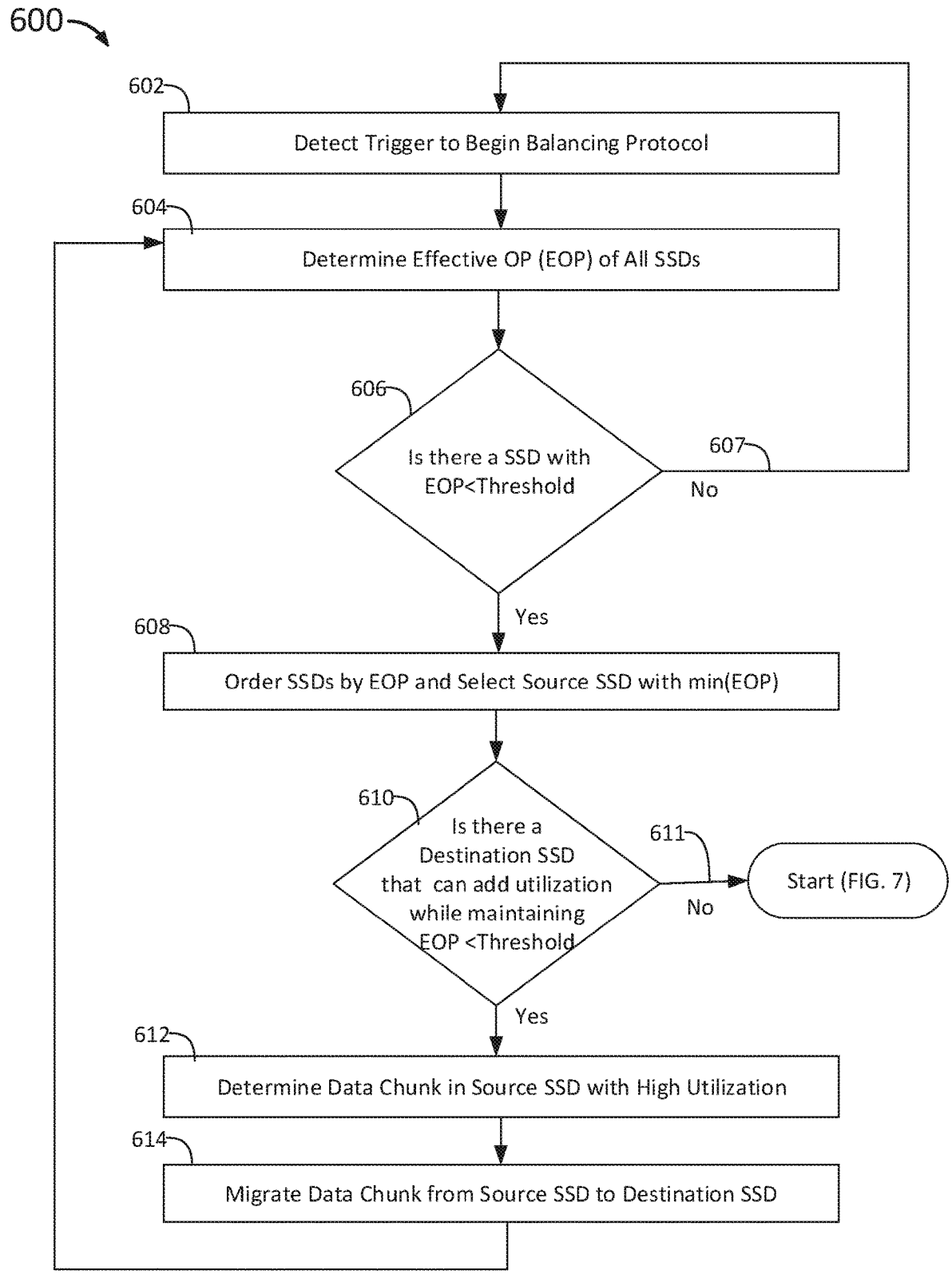
FIG. 6 shows a decision flow which balances the Over Provisioning across the pool of SSD according to one or more embodiments.

FIG. 6 shows a decision flow 600 for controlling the balancing of the OP across the pool of SSDs. The decision flow 600 may be used by the controller (such as controller 222 in FIG. 2) to balance the effective OP in a pool of SSDs.

At step 602, the controller is triggered to execute the balancing protocol every pre-defined time period, for example every hour or once a day. The controller may detect a time-based trigger or be triggered by the occurrence of an event. In some implementations the time period in which the balancing protocol is triggered is specified by the manufacturer. In some implementations, the time period in which the balancing protocol is triggered is specified by the user. In some implementations, the balancing protocol is triggered by a pre-defined time period and is additionally triggered by an event, such as a command by a user.

In step 604, after the balancing protocol trigger has been triggered, the controller checks the SSDs to retrieve the effective OP level of each SSD. The controller may use the extended API to determine the effective OP by accessing the mapping table and determining from the LBAs in the mapping table the utilization for a section of the SSD between a first and a second LBA for each SSD. In some implementations, the controller determines the effective OP by using equation 2, calculating the effective OP of the SSD from the utilization and the amount of bad blocks on the SSD in relation to the total capacity of the SSD.

In some implementations, the controller retrieves a different parameter related to the utilization of the SSD, or related to the utilization of a portion of the SSD. In step 606, the controller compares the effective OP level of each SSD to a stored threshold value and determines if there are any SSDs with an effective OP level which does not meet the threshold value. The threshold value is a predetermined effective OP value which is set by the manufacturer. In some implementations, the threshold value is at or below the "knee" value of WA versus OP, as shown in FIG. 1, for example about 15%.

If there are no SSDs with an effective OP level below the threshold value, the controller does not perform any balancing of the SSDs, and the controller waits for the next balancing protocol trigger on path 607. If the controller determines that there are SSDs which have an effective OP level below the threshold value, all such identified SSDs are subject to balancing.

For example, referring to the diagram in FIG. 5, the controller will have determined the first effective OP 520, the second effective OP 521, the third effective OP 522, and the fourth effective OP 524, and will have determined that the first SSD 510 has an effective OP lower than the threshold value.

In step 608 of FIG. 6, the controller determines an order in which to balance the OP levels of the SSDs which have an effective OP level below the threshold value. In some implementations, the controller orders the SSDs by the effective OP and determines that an SSD with a minimum effective OP value will be balanced first. In some implementations, the controller orders the SSDs by the effective OP and determines an order for balancing based on another parameter such as the access rate of the data on the SSDs. In some implementations, the controller orders the SSDs by the effective OP and selects the SSD with the minimum effective OP for balancing, and disregards the order of the remaining SSDs. In some implementations, the controller orders the SSDs and selects the SSD with the minimum effective OP, but also records the order of the remaining SSDs which are not selected for balancing after the balancing of the minimum effective OP list.

For example, again referring to FIG. 5, the controller determines that the third SSD 512 can accept a portion of the data of the first SSD 510, while maintaining an effective OP within the threshold value after the migration.

At step 610 of FIG. 6, the controller determines if there is a SSD that can accommodate additional utilization while remaining within the effective OP threshold. The controller determines which of the SSD can have additional utilization and chooses one of the determined SSDs as the destination SSD for the balancing protocol. The controller may pre-calculate the effective OP value for each possible destination SSD after migration in order to determine a destination SSD. Pre-calculating the effective OP may be desirable since migration of a data range increases the utilization of the SSD. The controller may choose the destination SSD based on various parameters, for example, such as choosing the SSD with the highest effective OP, choosing the first identified SSD which can accommodate additional utilization, randomly selecting an SSD from a set of SSDs having an effective OP within a range which includes the highest effective OP, or selecting an SSD which is the least recently accessed SSD from the set of SSDs having an effective OP within a range which includes the highest effective OP, and the like.

Figure 7:
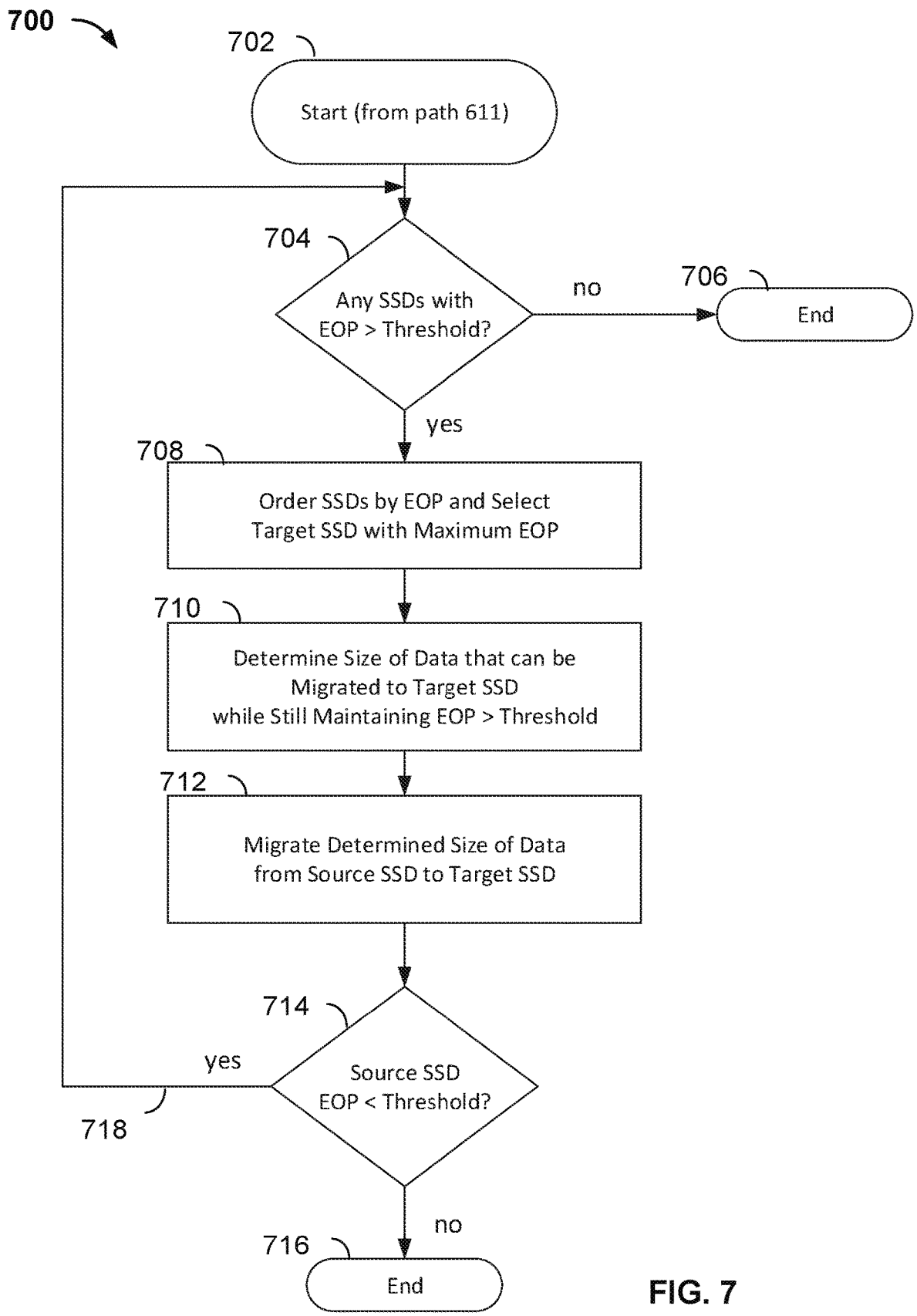
FIG. 7 shows a decision flow showing the second phase of the balancing protocol according to one or more embodiments.

If there is no SSD that can accommodate additional utilization while maintaining an effective OP above the threshold value, the controller moves to a second phase of the balancing protocol along path 611 to begin the process described in FIG. 7.

FIG. 7 shows a decision flow 700 for situations in which there is no single destination SSD that can accommodate the additional utilization and maintain an effecting OP which exceeds the threshold value. The decision flow 700 begins at step 702 after the controller has initiated the second phase of the protocol on path 611 from FIG. 6. At step 704, the controller determines if there are any SSDs with an effective OP which exceeds the threshold. If there are no SSDs with an effective OP exceeding the threshold, the controller ends the program at step 706 and returns to a waiting state. If there are SSDs with an effective OP which exceeds the threshold, the controller moves to step 708. At step 708, the controller orders the SSDs by the effective OP and selects a target SSD that has the maximum OP. At step 710, the controller determines the size or amount of data that can be migrated to the target SSD while still maintaining the effective OP of the target SSD above the threshold value. At step 712, the controller migrates the determined amount to the target SSD.

At step 714, the controller determines if the effective OP of the source SSD remains below the threshold. If the effective OP of the source SSD now exceeds the threshold, the controller ends the program at step 716. If the effective OP of the source SSD remains below the threshold value, the controller returns along pathway 718 to repeat the program beginning with the determination at step 704 as to whether there are any SSDs with an effective OP greater than the threshold. The controller may iterate through the SSDs in the pool according to the flow 700 to distribute the remaining additional utilization amongst the SSDs in the pool such that the destination SSDs and the source SSD end the process with effective OPs which exceed the threshold value.

Referring again to FIG. 6, alternatively, if the controller determines at step 610 in FIG. 6 that there is no single destination SSD that can accommodate the additional utilization, the controller may still choose a destination SSD with a higher effective OP that the source SSD and migrates an amount of data calculated to bring the effective OP of both source and destination SSDs to an equal value. In an alternative embodiment, if there is no SSD that can accommodate additional utilization while maintaining an effective OP above the threshold value, the controller ends the balancing protocol and returns to a waiting state.

If, in step 610 of FIG. 6, the controller determines that there is a SSD that can accommodate additional utilization, the controller moves on to step 612 in FIG. 6. After the selection of the source SSD and destination SSD, the controller determines which data to migrate from the source SSD to the destination SSD. At step 612, the controller determines a data range in the source SSD that will bring the effective OP within the threshold. The controller determines on the source SSD one or more data ranges which have a high utilization and are sized such that migrating the data ranges from the source SSD will bring the effective OP within the threshold value. If more than one appropriate data range is identified, the controller determines which data range will be migrated according to the parameters specified in the API.

The controller may determine the appropriate data ranges on the source SSD by determining the utilization for various data ranges using the mapping table. For example, the controller accesses the mapping table and can determine from the LBAs in the mapping table how many are mapped to each SSD.

A selection heuristic can be chosen such that the controller will determine the data range or segment with the smallest capacity and highest utilization in order to have the smallest migration penalty and the highest impact. However, in some implementations other selection heuristics may be preferred. Any data range that will satisfy the threshold value requirements for the effective OP for both the source and destination SSDs can be selected. In some implementations, the controller may determine which data range will be migrated based on the access rate of the data range on the source SSD or the available space on the destination SSD.

In some implementations, the controller can split a single source data range into multiple smaller data ranges to be placed on multiple destination SSDs. In some implementations, the controller may do so in order to more evenly balance the OP across the SSD pool. In some implementations, the controller may do so if no single destination SSD can accept the full source data range while maintaining an effective OP within the required threshold value.

At step 614, the controller migrates the identified data range from the source SSD to the destination SSD. The migration of the data range from the source SSD to the destination SSD should balance the SSDs such that both the source and destination SSDs have effective OP which satisfies the threshold value. The controller may determine before migrating the data that there is an acceptable portion of the destination SSD on which the data can be placed. The controller may then update the mapping tables to reflect the migrated data.

After the data range has been migrated from the source SSD to the destination SSD, the controller may cycle through any remaining identified SSDs which need to be balanced, performing the same steps. The migration of data ranges to balance the effective OP across the SSDs is continued until all SSDs in the pool have an effective OP above the threshold value or until migration of data is no longer feasible.

Alternatively, the controller may, at step 604, determine the effective OP for one SSD at a time, such that the controller begins the balancing protocol as soon as an SSD is identified with an effective OP below the threshold rather than determining the effective OP for all SSDs at step 604 and bypassing step 608.

As a further alternative, the controller may, at step 610, optimally select multiple destinations and the sizes of data chunks to each destination, such that the effective OPs of all SSDs after migration have the minimum standard deviation while maintaining an effective OP less than the threshold value for each SSD.

Figure 8:
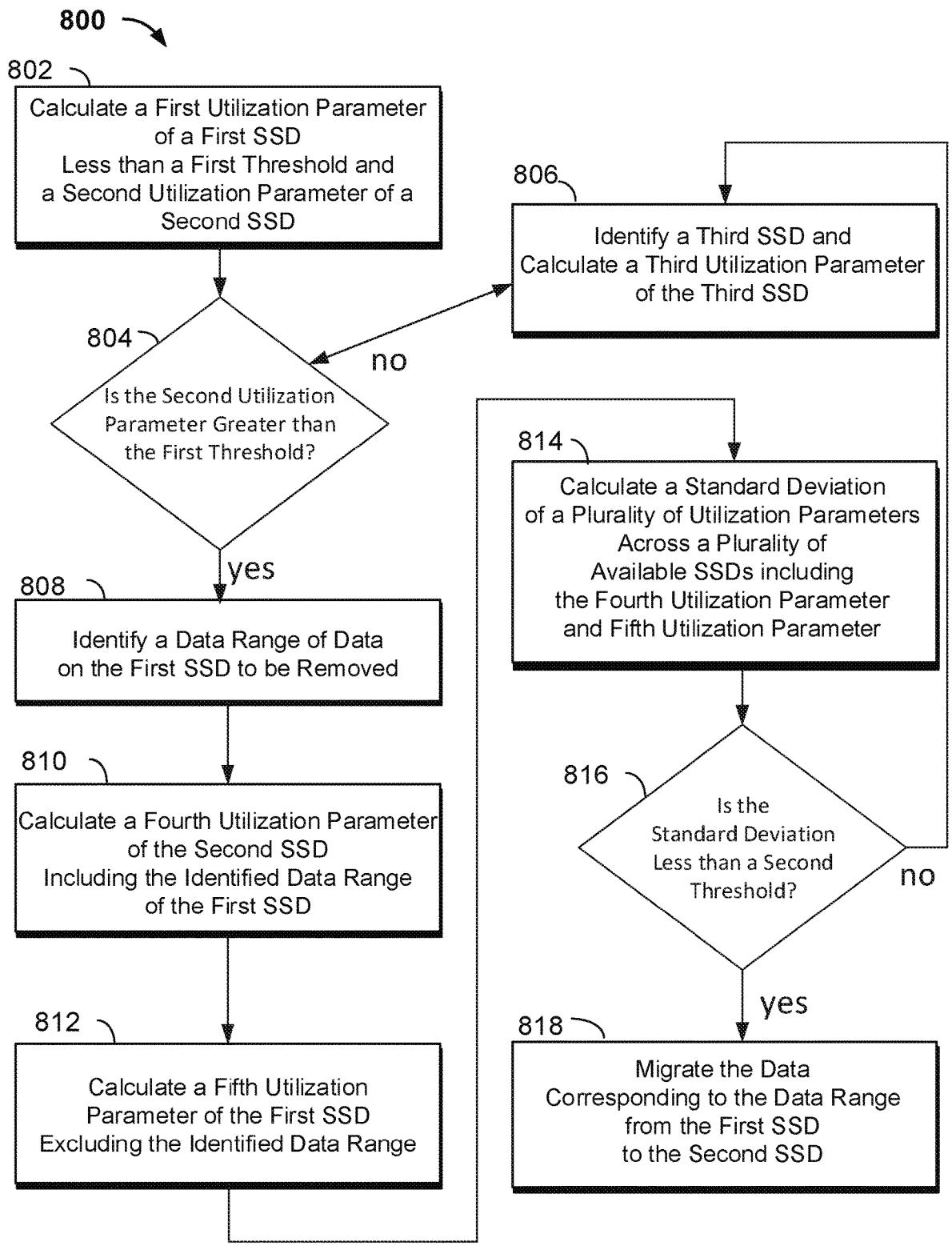
FIG. 8 shows a method for balancing a utilization parameter across the pool of SSDs according to one or more embodiments.

FIG. 8 shows a method 800 for balancing a utilization parameter across a pool of SSDs. The method 800 shows an operational flow by which the controller (such as controller 222 in FIG. 2) identifies an appropriate destination drive for the balancing protocol.

In step 802, a first utilization parameter of a first SSD and a Second utilization parameter of the second SSD are calculated. The first utilization parameter of the first SSD is lower than a first threshold value. The first utilization parameter and second utilization parameter may be a measure of the effective over-provisioning, or any other suitable parameter related to the utilization of the SSDs.

In step 804, the second utilization parameter is compared to the first threshold value. If the second utilization parameter is less than the first threshold value, the method progresses to step 806 where a third SSD is identified and a third utilization parameter is calculated for the third SSD. The third utilization parameter is then compared to the first threshold value at step 804, and the method proceeds.

If the second utilization parameter is greater than the first threshold value at step 804, the method proceeds to step 808. At step 808, a data range of data is identified on the first SSD to be removed. The data range is identified such that the removal of the data in the data range from the first SSD will bring the utilization parameter associated with the first SSD within the first threshold. At step 810, a fourth utilization parameter is calculated for the second SSD including the data from the identified data ranger of the first SSD. At step 812, a fifth utilization parameter is calculated for the first SSD which excludes the data in the identified data range of the first SSD. Steps 810 and 812 enable the controller to calculate the utilization of the first SSD and the second SSD after the migration of data from the first SSD to the second SSD. By pre-calculating the utilization parameters of the two SSDs, the controller can determine if the chosen destination SSD is acceptable and can optimize the migration of data and the balancing of utilization across available SSDs.

At step 814, a standard deviation of a plurality of utilization parameters across a plurality of available SSDs is calculated, including the fourth utilization parameter and the fifth utilization parameter. The calculation of the standard deviation enables the controller to determine what the balance of utilization across the plurality of available SSDs after the migration of data from the first SSD to the second SSD. At step 816, the standard deviation is compared to a second threshold value. If the standard deviation is greater than the second threshold value, the method returns to step 806 and a new destination SSD is determined. If the standard deviation is less than the second threshold, the method proceeds to step 818 and the data corresponding to the data range from the first SSD is migrated to the second SSD.

In some implementations, if the standard deviation is greater than the second threshold at step 816, instead of returning the method to step 806 to determine a new destination SSD, a utilization parameter of the second SSD including a portion of the data from the identified data range may be calculated and a second destination SSD is selected as a destination for the remaining portion of the data from the identified data range. The standard deviation can then be re-calculated to determine if the utilization is balanced when a portion of the data in the data range is spread between the two destination SSDs. In some implementations, the method may determine more than two destination SSDs for the data corresponding to the identified data range of the first SSD.

Calculating the standard deviation of the utilization parameters of the plurality of the SSDs in the pool of SSDs enables the controller to optimize the utilization across the pool of SSDs. An optimal balance of utilization across the pool of SSDs increases the longevity of the device and minimizes the risk of SSD or device failure.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A storage appliance comprising:
   a first solid state drive (SSD) and a second SSD configured to store data; and
   a controller;
   wherein the controller is configured to:
      calculate a first utilization parameter based on a total amount of utilized data on the first SSD and a second utilization parameter based on a total amount of utilized data on the second SSD;
      if the first utilization parameter is less than a threshold and the second utilization parameter exceeds the threshold:
         identify a data range of data stored on the first SSD to be removed, wherein removal of the identified data range from the first SSD causes the first utilization parameter based on the total amount of utilized data on the first SSD to exceed the threshold, and
         increase spare area in the first SSD by migrating the data corresponding to the identified data range from the first SSD to the second SSD.

2. The storage appliance of claim 1, wherein,
   the first utilization parameter is a first effective over provisioning value, and
   the threshold is a second effective over provisioning value associated with a target write amplification value.

3. The storage appliance of claim 1, the controller further configured to:
   calculate a third utilization parameter of the second SSD including the identified data range from the first SSD before migrating the data corresponding to the identified data range from the first SSD to the second SSD;
   compare the third utilization parameter to the threshold; and
   if the third utilization parameter exceeds the threshold, proceed to migrate the data corresponding to the identified data range from the first SSD to the second SSD.

4. The storage appliance of claim 3, wherein if the third utilization parameter does not exceed the threshold, the controller is further configured to:
  determine a first amount of data the second SSD can accept while maintaining the third utilization parameter above the threshold;
  migrate the determined first amount of data to the second SSD;
  select a third SSD having a fourth utilization parameter which exceeds the threshold;
  determine a second amount of data less than or equal to the identified data range from the first SSD less the determined first amount of data the third SSD can accept while maintaining the fourth utilization parameter above the threshold; and
  migrate the determined second amount of data to the third SSD.

5. The storage appliance of claim 3, wherein, after calculating the third utilization parameter of the second SSD including the data corresponding to the identified data range from the first SSD, the controller is further configured to:
  calculate a fourth utilization parameter of the first SSD excluding the data corresponding to the identified data range;
  calculate a standard deviation of a plurality of utilization parameters across a plurality of available SSDs including the third utilization parameter and the fourth utilization parameter; and
  if the standard deviation is below a predetermined value, migrate the data corresponding to the identified data range from the first SSD to the second SSD.

6. The storage appliance of claim 3, wherein if the third utilization parameter is less than the threshold, the controller is further configured to identify a third SSD having a fourth utilization parameter which exceeds the threshold.

7. The storage appliance of claim 1, further comprising an adapter configured to allow a host exposing a virtual disk to communicate data to the first SSD and the second SSD.

8. The storage appliance of claim 1, further comprising a mapping table configured to record the location of the stored data.

9. The storage appliance of claim 8, wherein the controller is further configured to determine, using the mapping table, the location of the data corresponding to the identified data range to be removed from the first SSD.

10. The storage appliance of claim 9, wherein the controller is further configured to calculate the first utilization parameter and second utilization parameter by querying the mapping table.

11. The storage appliance of claim 10, wherein the controller is configured to update the mapping table with a new location of the data corresponding to the identified data range migrated to the second SSD.

12. The storage appliance of claim 1, wherein the controller is configured to migrate the data corresponding to the identified data range from the first SSD to a region of the second SSD which is not utilized.

13. The storage appliance of claim 1, wherein the controller is configured to migrate the data corresponding to the identified data range from the first SSD to two or more regions of the second SSD which are not utilized.

14. The storage appliance of claim 1, wherein the controller is configured to determine a smallest data range of data which can be migrated to the second SSD to cause the first utilization parameter to exceed the threshold.

15. A method of balancing the utilization among a plurality of solid state drives (SSDs) in a storage appliance, the method comprising:
  calculating, at a controller, a first utilization parameter based on a total amount of utilized data on at least one first SSD;
  determining that the first utilization parameter for the at least one first SSD is less than a threshold:
  selecting a second SSD having a second utilization parameter based on a total amount of utilized data on the second SSD which exceeds the threshold;
  identifying a data range of data stored on the first SSD, the identified data range having a utilization level such that with removal of the identified data range from the first SSD the first utilization parameter based on the total amount of utilized data on the first SSD exceeds the threshold; and
  increasing spare area in the first SSD by migrating the data corresponding to the identified data range from the first SSD to the second SSDs.

16. The method of claim 15, wherein calculating the first utilization parameter comprises calculating an effective Over Provisioning value.

17. The method of claim 16, wherein calculating the first utilization parameter comprises consulting a mapping table to determine the utilization between a first logical block addressing (LBA) and a second LBA corresponding to the first SSD.

18. The method of claim 17, wherein calculating the first utilization parameter for at least one first SSD comprises calculating a utilization parameter for each of a plurality of SSDs.

19. The method of claim 18, the method further comprising:
  comparing the utilization parameter for each of the plurality of SSDs to the threshold;
  ordering the subset of SSDs from the plurality of SSDs that are less than the threshold; and
  selecting an SSD from the subset of SSDs with a minimum utilization parameter.

20. The method of claim 19, the method further comprising determining if the second SSD can accept the data corresponding to the identified data range and continue to exceed the threshold.

21. The method of claim 20, wherein if it is determined that the second SSD cannot accept the data corresponding to the identified data range and continue to exceed the threshold, the method further comprises:
  determining a first amount of data the second SSD can accept while maintaining the second utilization parameter above the threshold;
  migrating the determined first amount of data to the second SSD;
  selecting a third SSD having a third utilization parameter which exceeds the threshold;
  determining a second amount of data less than or equal to the identified data range from the first SSD less the determined first amount of data that the third SSD can accept while maintaining the third utilization parameter above the threshold; and
  migrating the determined second amount of data to the third SSD.

* * * * *